No. 787,375. PATENTED APR. 18, 1905.
F. GUTTERIDGE.
MOLD FOR THE MANUFACTURE OF CEMENT BLOCKS.
APPLICATION FILED AUG. 29, 1904.

Witnesses.
W. H. Smith
H. L. Trimble

Inventor
Frank Gutteridge
by Chas. H. Riches
his Attorney.

No. 787,375.

Patented April 18, 1905.

UNITED STATES PATENT OFFICE.

FRANK GUTTERIDGE, OF SEAFORTH, CANADA.

MOLD FOR THE MANUFACTURE OF CEMENT BLOCKS.

SPECIFICATION forming part of Letters Patent No. 787,375, dated April 18, 1905.

Application filed August 29, 1904. Serial No. 222,626.

*To all whom it may concern:*

Be it known that I, FRANK GUTTERIDGE, of Seaforth, in the county of Huron and Province of Ontario, Canada, have invented certain new and useful Improvements in Molds for the Manufacture of Cement Blocks and Artificial Stone; and I hereby declare that the following is a full, clear, and exact description of the same.

This invention relates to a portable mold for the manufacture of that class of building material known as "cement blocks" and "artificial stone" made from sand or other silicious substances and Portland cement or finely-pulverized lime. Satisfactory results have been obtained by intimately mixing together in a dry state well-screened sharp pit-sand containing not more than three per cent. loam or ashes or pulverized stone or other granular silicious material of a fine mesh with freshly-burnt lime or Portland cement until the coarser particles of the silicious material are coated with the finer particles of the cementing material, then slightly moistening the mixture, then placing the mixture in the mold and tamping it into a homogeneous mass of the required shape and density, and finally removing it from the mold to the place where it is to season or harden.

Owing to the granular nature of the freshly-molded block and the susceptibility of its homogeneity to become shattered by the disintegration of its component granules, it is necessary not only to exercise the greatest care in removing it from the mold, but also to so construct the mold that one of its sides may be employed as a follow-board or pallet upon which the molded block may be removed to the place where it is to season or harden.

For a full understanding of the invention reference it to be had to the following description and to the accompanying drawings, in which—

Figure 1:
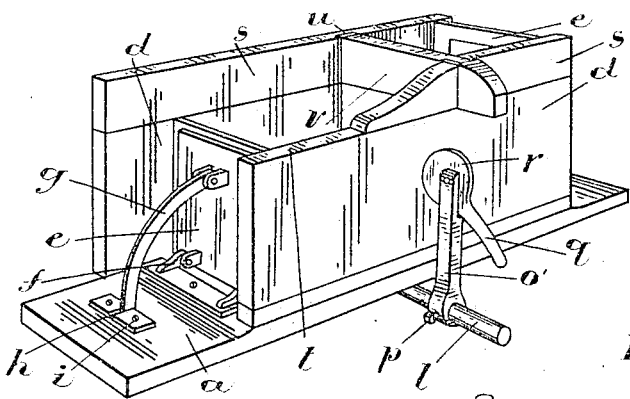
Figure 3:
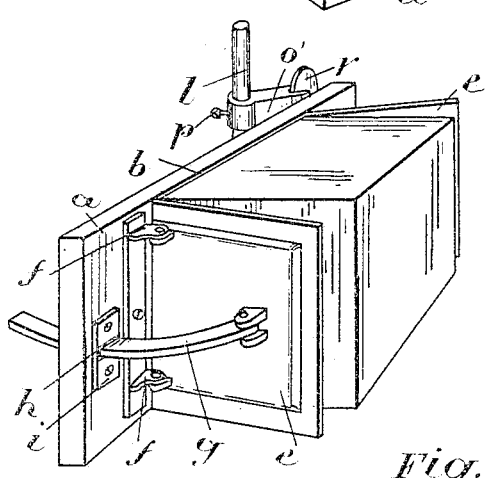
Figure 2:
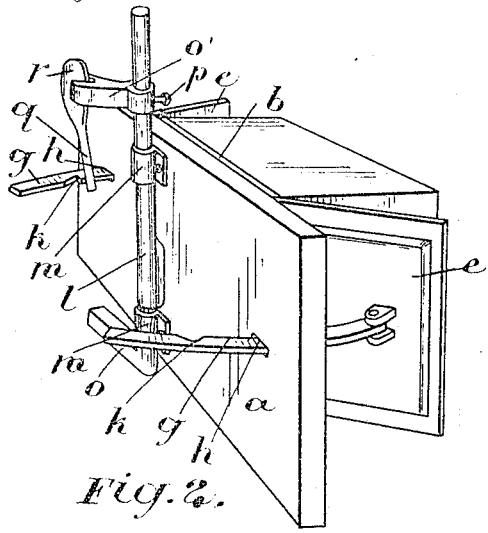
Figure 4:
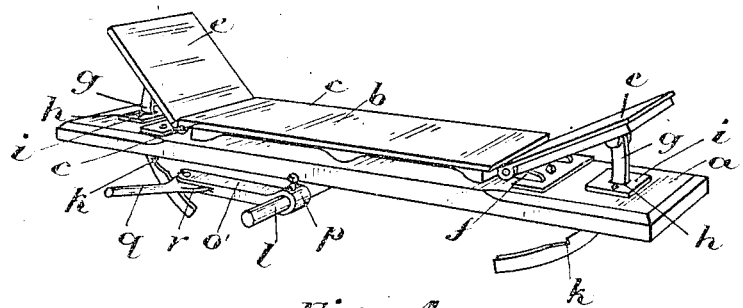

Figure 1 is a perspective view of the mold-box, showing the side and end members in their closed position. Fig. 2 is a perspective view showing the mold-box upset to deliver the molded block with one of the side members removed and both end members opened, so as to be moved out of contact with the molded block. Fig. 3 is a similar view to Fig. 2, but looking at it from the opposite side. Fig. 4 is a perspective view showing the bottom and end members of the mold-box.

Like letters of reference refer to like parts throughout the specification and drawings.

The bottom member $b$ of the mold-box is fixed to the top surface of the base $a$ so as to leave a margin $c$ along each side to be engaged by the bottom edges of the side members $d$ and end members $e$. The end members $e$ are articulatingly connected to the base $a$ at the ends of the bottom member $b$ by suitable hinges $f$, and connected to the outer surfaces of the end members $e$ are adjusting-arms $g$, protruding through corresponding apertures $h$ in the base $a$ between the ends of the bottom member $b$ and the end edges of the base $a$. Over the apertures $h$ are placed wear-plates $i$, having slots $j$ alining with the apertures $h$ to allow of the movement of the arms $g$, and in the inner edges of the arms $g$ are notches $k$ to engage the wear-plates $i$ for the purpose of preventing the downward movement of the arms $g$ when adjusted to hold the end members of the mold-box in their closed position against the ends of the bottom member $b$.

In assembling the parts of the mold-box the base $a$ is set so that the bottom member $b$ will be uppermost. The end members are then closed against the ends of the bottom member $b$ and held in their closed position by the adjusting-arms, the downward movement of which is prevented by the engagement of the notches $k$ with the wear-plates $i$. The side members $d$ are then placed in position against the sides of the bottom member $b$ and overlap the sides of the end members $e$ and are held in their closed position against the sides of the bottom and end members by a clamping device. This clamping device consists of a rotatable shaft $l$, journaled in bearings $m$, secured to the under surface of the base $a$, and two arms $o$ and $o'$, respectively connected to the shaft $l$ on opposite sides of the base $a$ to extend upwardly, so that one or both may respectively engage the outer surface of one or both side members $d$ when the parts of the mold-box are assembled. One clamping-arm, $o$, may form an integral part of the shaft $l$, while the other arm, $o'$, may be adjustably mounted upon the shaft and locked in position by a set-screw $p$. Fulcrumed to the clamping-arm $o'$ is a clamping-lever $q$, having a rounded face $r$ to engage the outer surface of the adjacent side member $d$. When it is desired to lock the side members against the bottom and end members, the shaft $l$ is turned to position the arms $o$ and $o'$ so that the arm $o$ will engage one of the side members $d$ and the other arm, $o'$, will be positioned where the clamping-lever $q$ will engage the outer surface of the adjacent side member $d$ with sufficient pressure to draw the arm $o$ tightly against the outer surface of the other side member $d$ to bind both side members against the side edges of the end and bottom members.

When the mold is constructed for making sills and lintels, it will be necessary to employ two or more sets of clamping-arms suitably located, the number of such sets depending upon the dimensions of the mold. For forming an angle-block both side members and one of the end members are fitted with extensions $s$ projecting above their top edges $t$, and in the sides of the extensions $s$ are grooves $u$ to receive a removable cross-piece $v$. When the block is molded, the mold-box is upset or turned into the position shown in Fig. 2, so that one of the side members $d$ may become the temporary bottom member and serve as a pallet or follow-board upon which the molded block may be carried away. The clamping-lever $q$ is then turned to relieve the side members of its own pressure and that of the arm $o$, so that the other side member $d$ may be withdrawn from the mold-box to relieve the adjacent surface of the molded block of any contact therewith. The notches $k$ are then disengaged from the wear-plates $i$, so that the adjusting-arms may be moved downward and the end members opened to be out of contact with the molded block. It is now possible to remove the base and the bottom and end members from the molded block or to remove the molded block upon the pallet or follow-board from the base and the bottom and end members.

Having thus fully described my invention, what I claim as new, and desire to secure by Letters Patent, is—

1. A mold for making cement blocks and artificial stone consisting of a bottom member, end members articulatingly connected thereto, locking-arms for the end members to rigidly hold them in their closed position, side members removable from the bottom member and rotatable clamping-arms to engage the side members and hold them in position against the bottom and end members.

2. A mold for making cement blocks and artificial stone consisting of a bottom member, end members articulatingly connected thereto, locking-arms for the end members to rigidly hold them in their closed position, side members removable from the bottom member, rotatable clamping-arms to engage the side members and hold them in position against the bottom and end members, and a clamping means connected to one of the clamping-arms to increase the clamping pressure against the side members.

3. A mold for making cement blocks and artificial stone consisting of a bottom member, end members articulatingly connected thereto, locking-arms for the end members to rigidly hold them in their closed position, side members removable from the bottom member, a rotatable shaft below the bottom member, clamping-arms carried by the rotatable shaft one of which is adapted to engage the outer surface of one of the side members, and a clamping-lever fulcrumed to the other clamping-arm to engage the outer surface of the other side member.

4. A mold for making cement blocks and artificial stone consisting of a bottom member, end members articulatingly connected thereto, notched locking-arms for the end members to rigidly hold them in their closed position, side members removable from the bottom member, rotatable clamping-arms to engage the side members and slotted wear-plates for the bottom member to engage the notched locking-arms for the end members.

Seaforth, August 19, A. D. 1904.

F. GUTTERIDGE.

In presence of—
  Joseph Weber,
  R. S. Hays.